(12) United States Patent
Thomson et al.

(10) Patent No.: US 8,239,483 B2
(45) Date of Patent: Aug. 7, 2012

(54) SYSTEM AND METHOD FOR GENERIC APPLICATION OF LOCATION DETERMINATION FOR NETWORK ATTACHED DEVICES

(75) Inventors: Martin Wyville Thomson, Keiraville (AU); Anthony James Winterbottom, Gwynneville (AU); Gary Neil Justusson, Figtree (AU)

(73) Assignee: Andrew, LLC, Hickory, NC (US)

( * ) Notice: Subject to any disclaimer, the term of this patent is extended or adjusted under 35 U.S.C. 154(b) by 274 days.

(21) Appl. No.: 12/404,944

(22) Filed: Mar. 16, 2009

(65) Prior Publication Data

US 2010/0235492 A1    Sep. 16, 2010

(51) Int. Cl.
  *G06F 15/16* (2006.01)
  *H04W 24/00* (2009.01)
(52) U.S. Cl. .................. 709/217; 455/456.1; 455/456.2; 455/456.3; 455/456.6; 455/404.2; 709/218
(58) Field of Classification Search .................. 709/217, 709/218; 455/404.2, 456.1–456.6; 370/352
See application file for complete search history.

(56) References Cited

U.S. PATENT DOCUMENTS

| | | | |
|---|---|---|---|
| 4,728,959 A | 3/1988 | Maloney | |
| 5,327,144 A | 7/1994 | Stilp et al. | |
| 5,608,410 A | 3/1997 | Stilp et al. | |
| 5,959,580 A | 9/1999 | Maloney et al. | |
| 6,047,192 A | 4/2000 | Maloney | |
| 6,091,362 A | 7/2000 | Stilp | |
| 6,097,336 A | 8/2000 | Stilp | |
| 6,101,178 A | 8/2000 | Beal | |
| 6,108,555 A | 8/2000 | Maloney et al. | |
| 6,115,599 A | 9/2000 | Stilp | |
| 6,119,013 A | 9/2000 | Maloney et al. | |

(Continued)

FOREIGN PATENT DOCUMENTS

WO    2004036240 A2    4/2004

(Continued)

OTHER PUBLICATIONS

M. Barnes et al.; "HTTP Enabled Location Delivery (HELD)", Internet Engineering Task force; Standard Working Draft, Internet Society; Geneva Switzerland; vol. geopriv, No. 13; Feb. 25, 2009; pp. 2-8.

*Primary Examiner* — Saleh Najjar
*Assistant Examiner* — Tae Kim
(74) *Attorney, Agent, or Firm* — Duane Morris, LLP (57) ABSTRACT

A system and method for determining the location of a target device. A location request may be received for a target device, and a plurality of parameters determined that identify the target device. A most likely path may be selected from a plurality of paths to produce a location of the target device, each path having one or more of the plural determined parameters as an input and one or more measurement results as an output. Measurement information may be collected on the most likely path as a function of one or more of the determined parameters to provide the one or more measurement results. Location information may then be derived for the target device as a function of the one or more measurement results, the derivation utilizing a location determination function that evaluates ones of the plural paths. An estimated location of the target device may then be determined as a function of the respective location information for the selected path.

22 Claims, 11 Drawing Sheets

U.S. PATENT DOCUMENTS

| | | | |
|---|---|---|---|
| 6,127,975 A | 10/2000 | Maloney | |
| 6,172,644 B1 | 1/2001 | Stilp | |
| 6,184,829 B1 | 2/2001 | Stilp | |
| 6,266,013 B1 | 7/2001 | Stilp et al. | |
| 6,281,834 B1 | 8/2001 | Stilp | |
| 6,285,321 B1 | 9/2001 | Stilp et al. | |
| 6,288,675 B1 | 9/2001 | Maloney | |
| 6,288,676 B1 | 9/2001 | Maloney | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,351,235 B1 | 2/2002 | Stilp | |
| 6,366,241 B2 | 4/2002 | Pack | |
| 6,388,618 B1 | 5/2002 | Stilp et al. | |
| 6,400,320 B1 | 6/2002 | Stilp et al. | |
| 6,463,290 B1 | 10/2002 | Stilp et al. | |
| 6,483,460 B2 | 11/2002 | Stilp et al. | |
| 6,492,944 B1 | 12/2002 | Stilp | |
| 6,519,465 B2 | 2/2003 | Stilp et al. | |
| 6,546,256 B1* | 4/2003 | Maloney et al. | 455/404.2 |
| 6,563,460 B2 | 5/2003 | Stilp et al. | |
| 6,603,428 B2 | 8/2003 | Stilp | |
| 6,646,604 B2 | 11/2003 | Anderson | |
| 6,661,379 B2 | 12/2003 | Stilp et al. | |
| 6,765,531 B2 | 7/2004 | Anderson | |
| 6,771,625 B1 | 8/2004 | Beal | |
| 6,782,264 B2 | 8/2004 | Anderson | |
| 6,873,290 B2 | 3/2005 | Anderson et al. | |
| 6,876,859 B2 | 4/2005 | Anderson et al. | |
| 6,940,950 B2* | 9/2005 | Dickinson et al. | 379/45 |
| 6,968,044 B2* | 11/2005 | Beason et al. | 379/45 |
| 6,996,392 B2 | 2/2006 | Anderson | |
| 7,016,478 B2* | 3/2006 | Potorny et al. | 379/49 |
| 7,023,383 B2 | 4/2006 | Stilp et al. | |
| 7,167,713 B2 | 1/2007 | Anderson | |
| 7,260,186 B2* | 8/2007 | Zhu et al. | 379/45 |
| 7,271,765 B2 | 9/2007 | Stilp et al. | |
| 7,340,259 B2 | 3/2008 | Maloney | |
| 7,427,952 B2 | 9/2008 | Bull et al. | |
| 7,440,762 B2 | 10/2008 | Maloney et al. | |
| 7,593,738 B2 | 9/2009 | Anderson | |
| 7,623,871 B2* | 11/2009 | Sheynblat | 455/456.1 |
| 7,627,333 B2* | 12/2009 | Kennedy et al. | 455/456.2 |
| 7,697,509 B2* | 4/2010 | Freitag et al. | 370/352 |
| 7,706,356 B1* | 4/2010 | Olshansky et al. | 370/352 |
| 7,729,706 B2* | 6/2010 | Kim et al. | 455/456.1 |
| 7,764,231 B1* | 7/2010 | Karr et al. | 342/457 |
| 7,917,156 B2* | 3/2011 | Sheynblat | 455/456.1 |
| 8,032,156 B2* | 10/2011 | Khushu | 455/456.3 |
| 8,073,466 B2* | 12/2011 | Han et al. | 455/456.2 |
| 2002/0127993 A1* | 9/2002 | Zappala | 455/404 |
| 2002/0172223 A1 | 11/2002 | Stilp et al. | |
| 2003/0064734 A1 | 4/2003 | Stilp et al. | |
| 2003/0211839 A1* | 11/2003 | Baum et al. | 455/403 |
| 2005/0048947 A1* | 3/2005 | Holland et al. | 455/404.1 |
| 2006/0003775 A1* | 1/2006 | Bull et al. | 455/456.1 |
| 2006/0030333 A1 | 2/2006 | Ward et al. | |
| 2006/0281437 A1* | 12/2006 | Cook | 455/404.2 |
| 2007/0055746 A1* | 3/2007 | Oran et al. | 709/217 |
| 2007/0111746 A1 | 5/2007 | Anderson et al. | |
| 2007/0155401 A1 | 7/2007 | Ward et al. | |
| 2007/0155489 A1 | 7/2007 | Beckley et al. | |
| 2007/0202927 A1* | 8/2007 | Pfleging et al. | 455/567 |
| 2007/0270164 A1* | 11/2007 | Maier et al. | 455/456.2 |
| 2008/0132244 A1 | 6/2008 | Anderson et al. | |
| 2008/0132247 A1 | 6/2008 | Anderson et al. | |
| 2008/0137524 A1 | 6/2008 | Anderson et al. | |
| 2008/0158059 A1 | 7/2008 | Bull et al. | |
| 2008/0160952 A1* | 7/2008 | Bull et al. | 455/404.2 |
| 2008/0160953 A1* | 7/2008 | Mia et al. | 455/404.2 |
| 2008/0161015 A1* | 7/2008 | Maloney et al. | 455/456.1 |
| 2008/0248811 A1 | 10/2008 | Maloney et al. | |
| 2008/0261611 A1 | 10/2008 | Mia et al. | |
| 2008/0261612 A1 | 10/2008 | Mia et al. | |
| 2008/0261613 A1 | 10/2008 | Anderson et al. | |
| 2008/0261614 A1 | 10/2008 | Mia et al. | |
| 2008/0274750 A1* | 11/2008 | Carlson et al. | 455/456.1 |
| 2009/0005061 A1* | 1/2009 | Ward et al. | 455/456.1 |
| 2009/0156231 A1* | 6/2009 | Versteeg et al. | 455/456.1 |
| 2010/0173647 A1* | 7/2010 | Sheynblat | 455/456.1 |
| 2012/0064911 A1* | 3/2012 | Khushu | 455/456.1 |
| 2012/0071172 A1* | 3/2012 | Gaal | 455/456.1 |

FOREIGN PATENT DOCUMENTS

| | | |
|---|---|---|
| WO | 2005065320 A2 | 7/2005 |
| WO | 2006088472 A1 | 8/2006 |

* cited by examiner

SYSTEM AND METHOD FOR GENERIC APPLICATION OF LOCATION DETERMINATION FOR NETWORK ATTACHED DEVICES

BACKGROUND

The location of a mobile, wireless or wired device is a useful and sometimes necessary part of many services. A Location Information Server ("LIS") may be responsible for providing location information to such devices with an access network. The LIS may utilize knowledge of the access network and its physical topology to generate and serve location information to devices.

The LIS, in general terms, is a network node originally defined in the National Emergency Number Association ("NENA") i2 network architecture addressing a solution for providing E-911 service for users of Voice over Internet Protocol ("VoIP") telephony. In VoIP networks, the LIS is the node that determines the location of the VoIP terminal. Beyond the NENA architecture and VoIP, the LIS is a service provided by an access network provider to supply location information to users of the network by utilizing knowledge of network topology and employing a range of location determination techniques to locate devices attached to the network. The precise methods used to determine location are generally dependent on the type of access network and the information that can be obtained from the device. For example, in a wired network, such as Ethernet or DSL, a wiremap method is commonplace. In wiremap location determination, the location of a device may be determined by finding which cables are used to send packets to the device. This involves tracing data through aggregation points in the network (e.g., Ethernet switches, DSL access nodes) and finding the port for which packets are sent to the device. This information is combined with data available to the LIS (generally extracted from a database) to determine a final location of the device.

In wireless networks, a range of technologies may be applied for location determination, the most basic of which uses the location of the radio transmitter as an approximation. The Internet Engineering Task Force ("IETF") and other standards forums have defined various architectures and protocols for acquiring location information from an LIS. In such networks, an LIS may be automatically discovered and location information retrieved using network specific protocols. Location information may be retrieved directly or the LIS may generate temporary uniform resource identifiers ("URI") utilized to provide location indirectly (i.e., location URI). Geodetic and civic positions of a mobile device may be determined as a function of location information from the LIS. There is, however, a need in the art to overcome the limitations of the prior art and provide a novel system and method for a generic application of location determination for network attached devices.

One embodiment of the present subject matter provides a method for determining the location of a target device. The method may comprise receiving a location request for a target device, and determining a plurality of parameters that identify the target device. A most likely path may be selected from a plurality of paths to produce a location of the target device, each path having one or more of the plural determined parameters as an input and one or more measurement results as an output. Measurement information may be collected on the most likely path as a function of one or more of the determined parameters to provide the one or more measurement results. Location information may then be derived for the target device as a function of the one or more measurement results, the derivation utilizing a location determination function that evaluates ones of the plural paths. An estimated location of the target device may then be determined as a function of the respective location information for the selected path.

Another embodiment of the present subject matter provides a method for determining the location of a target device. The method may comprise receiving a location request for a target device and determining a plurality of parameters that identify the target device. Measurement information may be collected as a function of one or more of the plural determined parameters to provide a plurality of measurement results. Location information may then be derived for the target device as a function of one or more of the plural measurement results. This derivation may utilize a location determination function that evaluates one or more paths, each path having one or more of the plural determined parameters as an input and one or more of the plural measurement results as an output. A path from the one or more evaluated paths may be identified as a failed path if location information could not be derived from the identified path. The collection, derivation and identification steps may be iteratively repeated until a most likely path is determined. Upon determining this most likely path, an estimated location of the target device may be determined as a function of the respective location information for the determined path.

A further embodiment of the present subject matter provides an LIS comprising circuitry for receiving a location request for a target device, circuitry for determining a plurality of parameters that identify the target device, and circuitry for selecting a most likely path from a plurality of paths, each path having one or more of the plural determined parameters as an input and one or more measurement results as an output. The LIS may further include circuitry for deriving location information for the target device as a function of one or more measurement results, the derivation utilizing a location determination function that evaluates ones of the plural paths and circuitry for collecting measurement information as a function of one or more of the plural determined parameters to provide the one or more measurement results. The LIS may also include circuitry for determining an estimated location of the target device as a function of the respective location information for the selected path.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION

With reference to the figures where like elements have been given like numerical designations to facilitate an understanding of the present subject matter, the various embodiments of a system and method for the generic application of location determination for network attached devices are herein described.

As generally discussed above, the Location Information Server ("LIS") is a network server that provides devices with information about their location. The phrases and respective acronyms of Location Information Server ("LIS") and Location Server ("LS") are used interchangeably throughout this document and such should not limit the scope of the claims appended herewith. Devices that require location information are able to request their location from the LIS. In the architectures developed by the IETF, NENA and other standards forums, the LIS may be made available in an exemplary IP access network connecting one or more target devices to the Internet. In other modes of operation, the LIS may also provide location information to other requesters relating to a target device. To determine location information for a target device, an exemplary LIS may utilize a range of methods. The LIS may use knowledge of network topology, private interfaces to networking devices like routers, switches and base stations, and location determination algorithms. Exemplary algorithms may include known algorithms to determine the location of a mobile device as a function of satellite information, satellite assistance data, various downlink or uplink algorithms such as, but not limited to, time difference of arrival ("TDOA"), time of arrival ("TOA"), angle of arrival ("AOA"), round trip delay ("RTD"), signal strength, advanced forward link trilateration ("AFLT"), enhanced observed time difference ("EOTD"), observed time difference of arrival ("OTDOA"), uplink-TOA and uplink-TDOA, enhanced cell/sector and cell-ID, etc., and hybrid combinations thereof.

A location server according to an embodiment of the present subject matter may utilize a range of inputs in order to determine location information for the target device. From a request made of the location server, the location server may determine one or more parameters, e.g., Internet Protocol ("IP") and Media Access Control ("MAC") addresses, that uniquely identify the target mobile device. This identification information may be used as an input to an exemplary measurement collection process that produces further information in the form of measurements or measurement results. Measurement information may be data already known to the location server, additional parameters that identify the target mobile device in other ways, and/or parameters relating to the network attachment of the target mobile device. Non-limiting examples include the MAC address of the device, the identity of network nodes from which network traffic to and from the device transits (including any physical connections involved), the location of network intermediaries (e.g., wiring maps), radio timing, signal strength measurements and other terrestrial radio frequency information, and network configuration parameters, to name a few.

Figure 1:
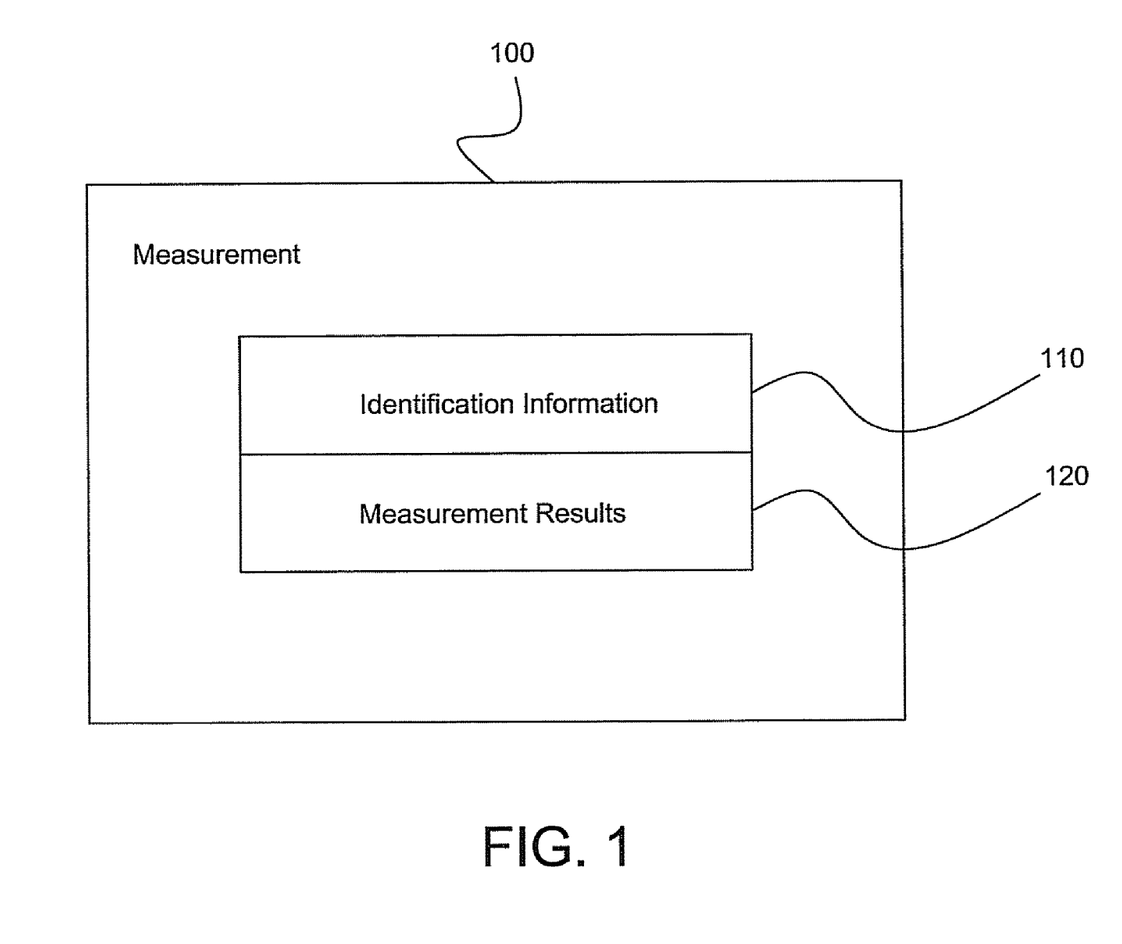
FIG. 1 is a generic diagram of measurement information.

FIG. 1 is a generic diagram of measurement information. With reference to FIG. 1, measurements 100 may be characterized by two components: information 110 that identifies a measurand, or item being measured, and measurement results 120. Protocols such as Flexible LIS-ALE Protocol ("FLAP") are being developed in the Alliance for Telecommunications Industry Solutions ("ATIS") forum to provide a formal definition of location-related measurements for different types of access networks. FLAP generally facilitates transfer of values of location measurement parameters form a network to the LIS to enable the latter to compute the location of an IP end-device. The LIS may interact with an Access Location Entity ("ALE") residing in an access network to retrieve location measurements. Identification information 110 may be considered as an input to a measurement process, and the measurement results 120 may be considered as the output.

Figure 2A:
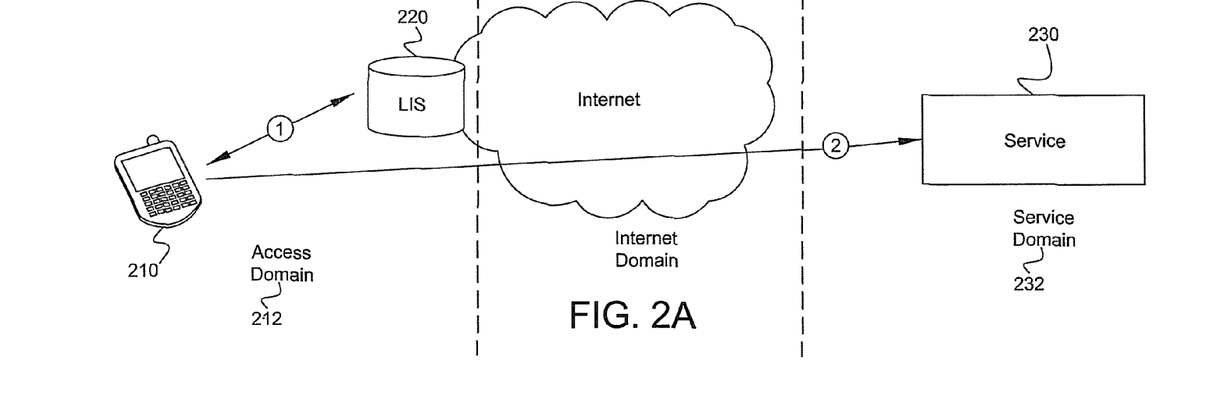
FIGS. 2A-2C are diagrams of Internet location services models.
Figure 2B:
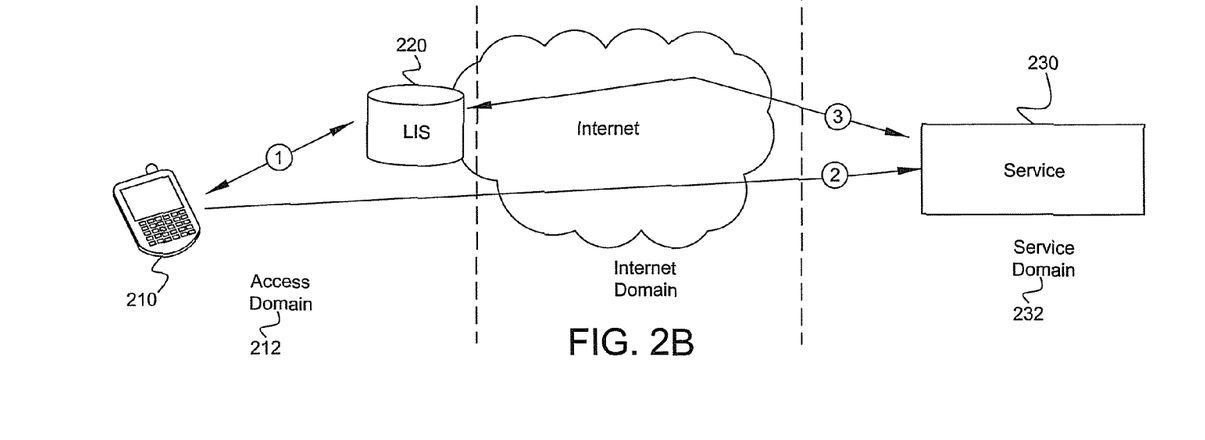
Figure 2C:
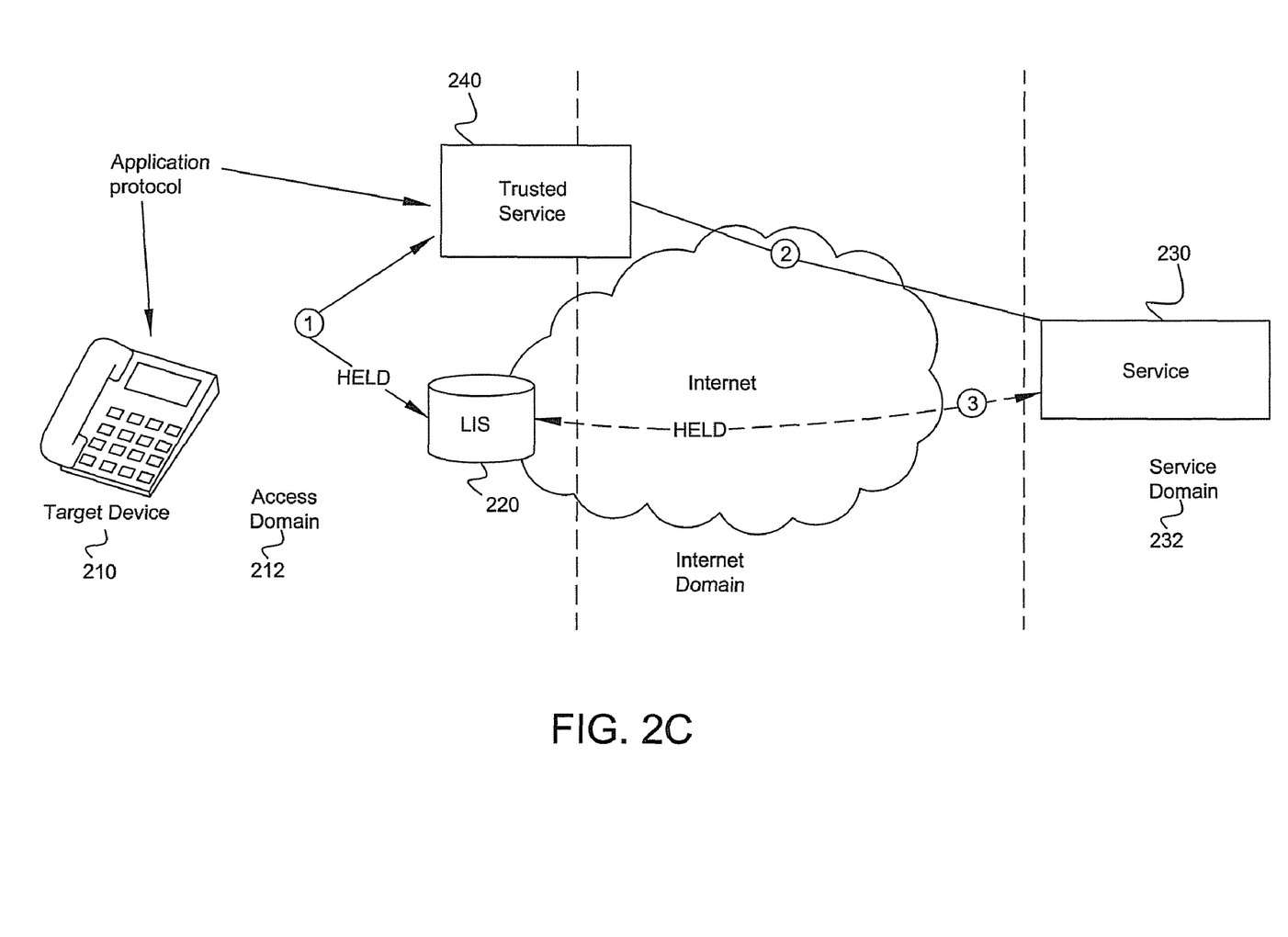

There are many models in which an LIS may be utilized. For example, FIGS. 2A-2C provide three examples of Internet location services models for an LIS. With reference to FIG. 2A, a location by value model is provided in which a target device 210 may obtain a location from a location server 220 in a respective access network or domain 212. The device 210 may then convey its location to a location based service 230 in the service domain 232 using an appropriate application protocol. With reference to FIG. 2B, a location by reference model is provided in which a mobile device 210 may obtain a reference from the location server 220 in the respective access network or domain 212. The device 210 may convey the reference to the location based service 230 in the service domain using an appropriate application protocol. The service 230 may then query the location server 220 direct for location values for the device 210. Generally the protocol utilized for communication between the device 210 and location server 220 is HTTP Enabled Location Delivery ("HELD") and the protocol utilized for communication between the location server 220 and the service 230 is HELD. The protocol utilized for communication between the device 210 and the service 230 is application protocol dependent.

With reference to FIG. 2C, an on-behalf-of ("OBO") location model is provided in which a trusted third party application or service 240 queries for the location of a device 210. A client identity, which is understood by the location server 220, may be used as a query parameter (e.g., IP or MAC address). If applicable, the third party 240 may provide location information to external service entities 230. If the location was requested and provided by reference, the external entity 230 may query back to the location server 220 for location value updates using the HELD protocol. The above described Internet location services models illustrate how LIS clients may request and receive location information from the LIS. The value of parameters derived from such a communications network may be used by the device and may be used by the LIS to determine location. In order to make use of these parameters, it is necessary for their values to be transferred form the communication network elements to the LIS, which is one purpose of FLAP.

Figure 3:
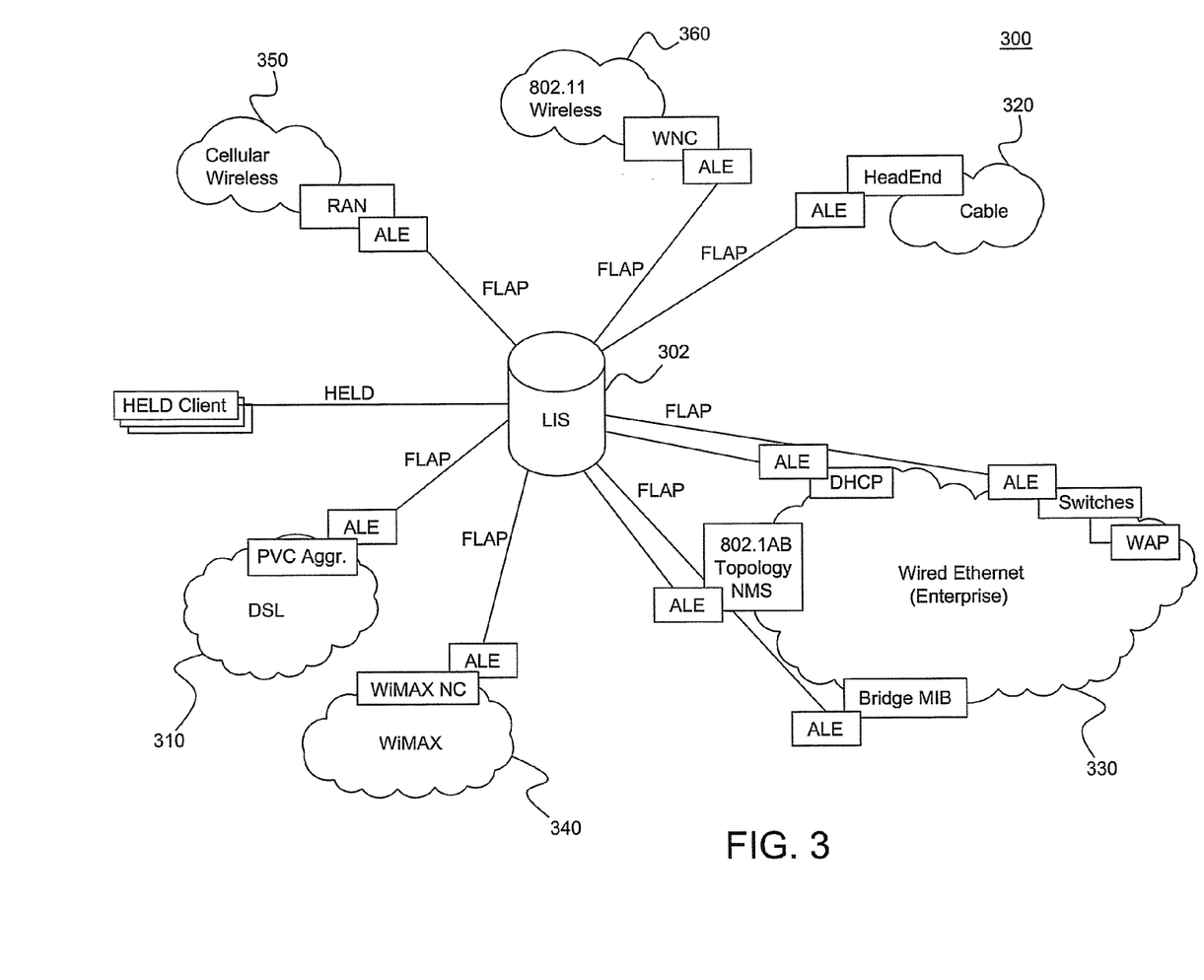
FIG. 3 is a diagram of an exemplary access network model.

FIG. 3 is a diagram of an exemplary access network model. With reference to FIG. 3, an exemplary access network model 300 may include one or more LISs 302 connected to one or more access networks, 310-360. An access network refers to a network that provides a connection between a device and the Internet. This may include the physical infrastructure, cabling, radio transmitters, switching and routing nodes and servers. The access network may also cover services required to enable IP communication including servers that provide addressing and configuration information such as DHCP and DNS servers. Examples of different types of access networks include, but are not limited to, DSL 310, cable 320, WiFi, wired Ethernet 330, WiMAX 340, cellular packet services 350, and 802.11 wireless 360, among others.

Figure 4:
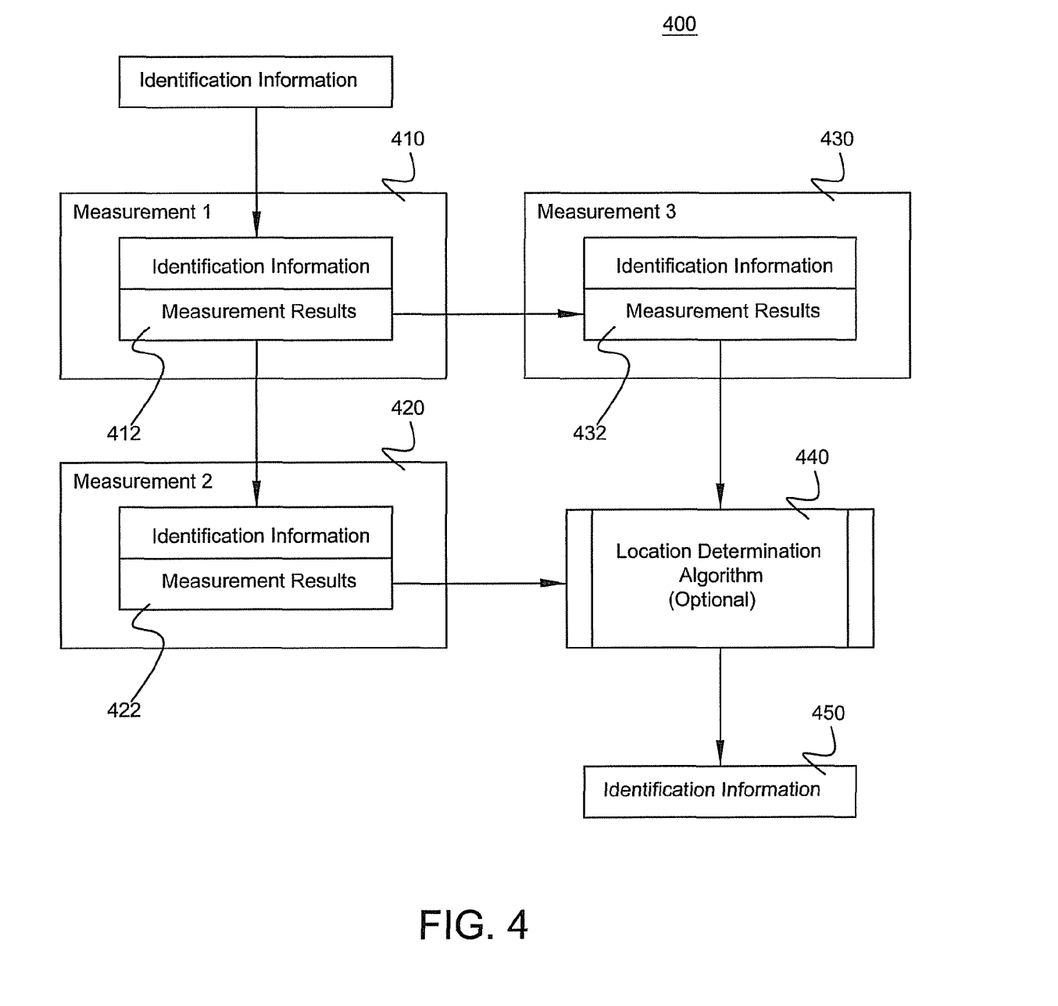
FIG. 4 is a diagram showing an iterative process according to an embodiment of the present subject matter.

An exemplary location server 302 may take the measurement results produced or supplied from such networks 310-360 and may initiate further measurement collection. FIG. 4 is a diagram showing an iterative process according to an embodiment of the present subject matter. With reference to FIG. 4, the measurement collection process 400 may be iterative, that is, the location server may use the measurement results 412 from a first measurement process 410 as an input (i.e., identification information) to one or more subsequent measurement collection processes 420, 430. The measurement results 422, 432 from these subsequent processes may be utilized as inputs to additional measurement processes, and/or once sufficient information is available, location information 450 for a target device may be derived by the location server using algorithms 440 that take the measurement results 422, 432 as an input. Exemplary algorithms may include known algorithms to determine the location of a mobile device as a function of satellite information, satellite assistance data, various downlink or uplink algorithms such as, TDOA, TOA, AOA, RTD, signal strength, AFLT, EOTD, OTDOA, uplink-TOA and uplink-TDOA, enhanced cell/sector and cell-ID, etc., and hybrid combinations thereof. Alternatively, the location information may be extracted directly from the measurement results, and the measurements results may include the desired location information.

Figure 5:
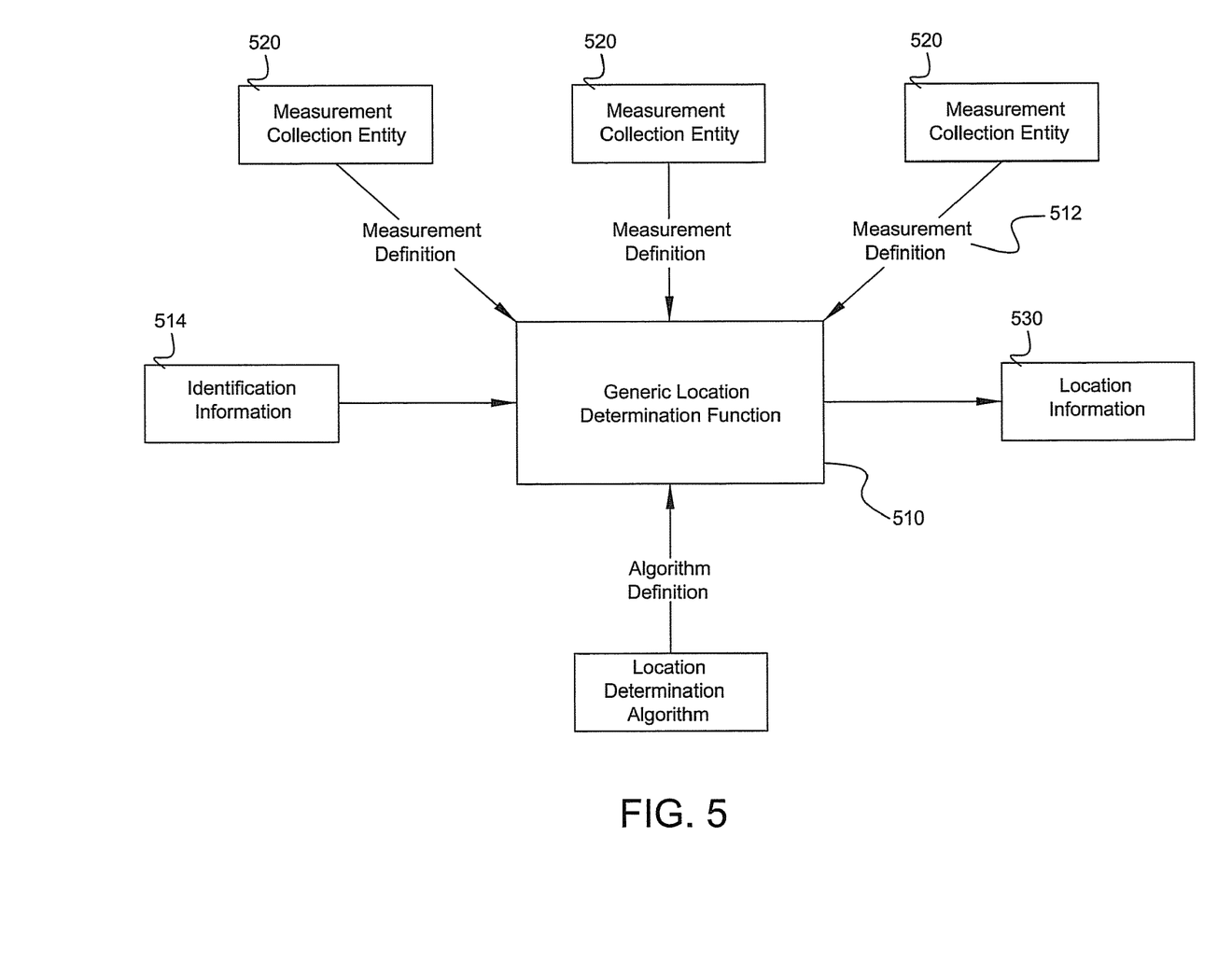
FIG. 5 is a diagram of an exemplary generic location determination function according to an embodiment of the present subject matter.

FIG. 5 is a diagram of an exemplary generic location determination function according to an embodiment of the present subject matter. With reference to FIG. 5, a location determination function 510 may generally be the element of the location server that assembles measurements and measurement definitions 512 from measurement collection entities (e.g., access networks, etc.) 520, collects identification information 514 and calculates location information 530 for a target device. Embodiments of the present subject matter provide a method and system of performing location determination adaptable to operate on any set of possible measurements from one or more similar or disparate access networks. For example, an exemplary location determination function 510 may commence with the information 514 that identifies the target device and programmatically determines what measurements 512 should be collected.

Figure 6:
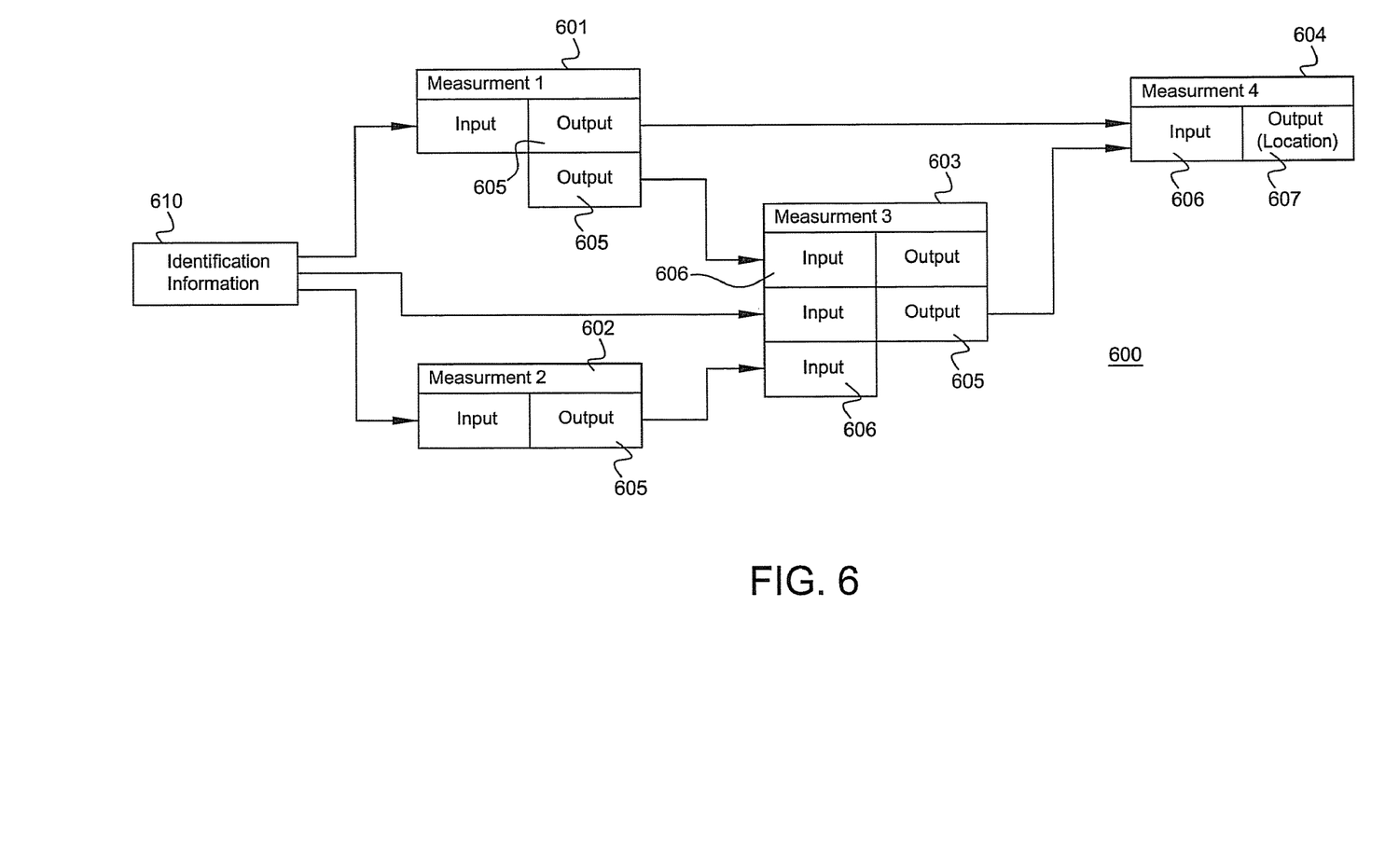
FIG. 6 is a diagram of an exemplary location determination function according to an embodiment of the present subject matter.

FIG. 6 is a diagram of an exemplary location determination function according to an embodiment of the present subject matter. With reference to FIG. 6, a location determination function 600 may determine which measurements should be collected by examining a graph/trellis or process paths formed by connecting the identification information 610 available to the inputs of possible measurements 601, 602, 603, 604. The outputs 605 of connected measurements may then be connected to inputs 606 of other measurements. The optimal path through this graph that produces a desired location information 607 as one of the outputs may be selected. Paths may be evaluated based on quality of service ("QoS") parameters such as, but not limited to, the time required to gather measurements and the expected quality of the result (some paths may produce better results). In one embodiment, the path that represents the least cost or the best result may be selected.

In certain embodiments of the present subject matter, a path may be pre-selected or re-evaluated as each step in the process completes. Because time may play a significant role in the selection of an optimal path, re-evaluation after each step enables the actual time for each measurement collection to be considered, rather than a predicted time. Once a path is selected, the measurements for this path are collected, starting from the initial identification information. Inputs to each measurement collection process may be selected from the output of other measurement collections as required. It should be noted that while the term "path" implies a serial process, such should not limit the scope of the claims appended herewith as multiple measurements may be acquired concurrently (hence in parallel fashion) thus providing that one measurement does not necessarily rely upon the output of any other measurement.

Figure 7:
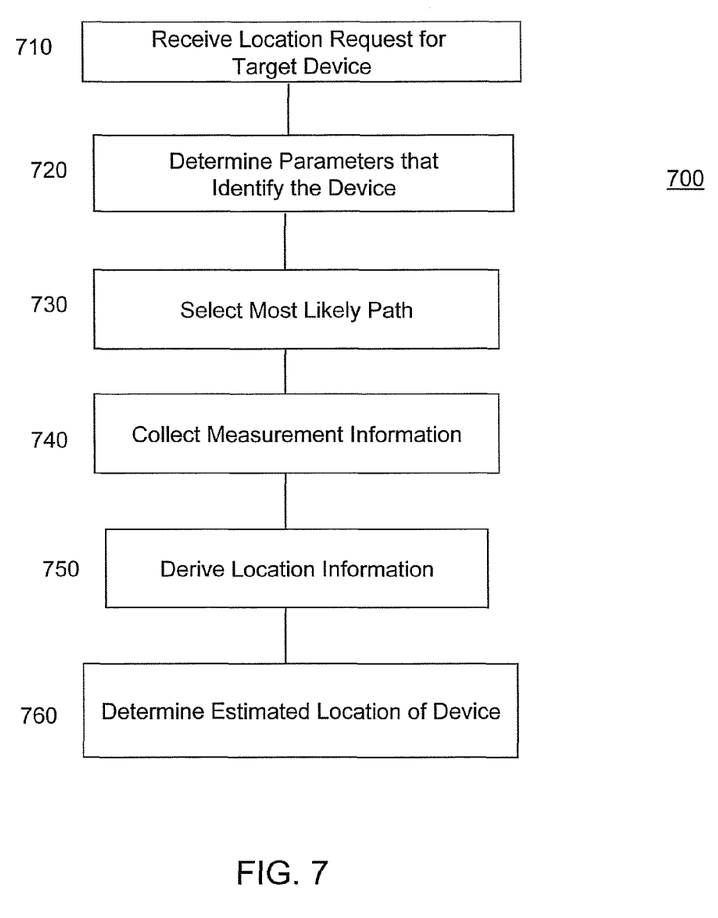
FIG. 7 is an algorithm according to one embodiment of the present subject matter.

FIG. 7 is an algorithm according to one embodiment of the present subject matter. With reference to FIG. 7, a method 700 for determining the location of a target device is provided. An exemplary device may be, but is not limited to, a cellular device, text messaging device, computer, portable computer, vehicle locating device, vehicle security device, communication device, and wireless transceiver. At step 710, a location request for a target device may be received and a plurality of parameters determined that identify the target device at step 720. Ones of the plural parameters may be, but are not limited to, Internet Protocol addresses, Media Access Control addresses, Ethernet Hardware Address, hardware address, adapter address, other hardware or software addresses, and combinations thereof.

At step 730, a most likely path may be selected from a plurality of paths to produce a location of the target device, each path having one or more of the plural determined parameters as an input and one or more measurement results as an output. At step 740, measurement information may be collected on the most likely path as a function of one or more of the plural determined parameters to provide a plurality of measurement results. In one embodiment, the collection process may be iteratively repeated to collect a predetermined amount of measurement information. Further, measurement results from a previous collecting step may be used as an input to a subsequent collecting step. Exemplary measurement information may be the Internet Protocol address of the target device, Media Access Control address of the target device, Ethernet Hardware Address of the target device or component serving the device, hardware address of the target device or component serving the device, adapter address of the target device or component serving the device, identity of a network node through which network traffic to and from the device transits, location of network intermediaries, radio timing measurements, signal strength measurements, network configuration parameters, and combinations thereof.

Location information for the target device may be derived at step 750 as a function of one or more of the plural measurement results. This derivation may utilize a location determination function that evaluates one or more paths. In one embodiment, this derivation may further include deriving location information as a function of an algorithm that utilizes one or more measurement results as an input or may comprise extracting location information directly from one or more measurement results. At step 760, an estimated location of the target device determined as a function of the respective location information for the selected path. In another embodiment, a path may be identified from the evaluated paths as failed if location information could not be derived therefrom. It should be noted that the number of the plural determined parameters may be increased as an input to thereby increase the number of measurement results provided as outputs; therefore, the step of selecting a most likely path may further comprise selecting a most likely path having the fewest number of measurement results.

In certain circumstances, such as wireless access networks, location information may be calculated from measurement results using an algorithm. For example, in a cellular environment, measurements may be made of the time that particular radio signals are received. A calculation may then be performed on the measurement results to determine an estimated location of the target device. This calculation is generally performed using a customized procedure, and may be implemented in software or using computer readable media. Another embodiment of the present subject matter may also include algorithms that take measurement results as an input and produce location information or other measurement results as an output. Algorithms may be characterized in this embodiment by a set of data provided as an input. Any number or types of algorithms may be incorporated into the graph described above by modeling it as a measurement that takes the given input and produces a specific output. Further, such algorithms may be treated identically to measurement collection, that is, the basic concept may be refined to refer to measurement determination entities.

In the event that a particular measurement determination entity is unable to produce a result, execution of a selected path may not be completed. In this instance, the process may be restarted, but the measurement determination entity that could not produce a result is marked as having failed so that paths traversing this failed entity are not executed. A path that produces a location result, however, may still be considered to be a failure for other reasons. For example, such a path may be considered as a failure if the quality of the respective measurement results is inadequate. In such a case, an exemplary location determination function may be invoked again, and to prevent the same path from being invoked, which would likely produce the exact same result, the last step of the process would be marked or identified as having failed.

Figure 8:
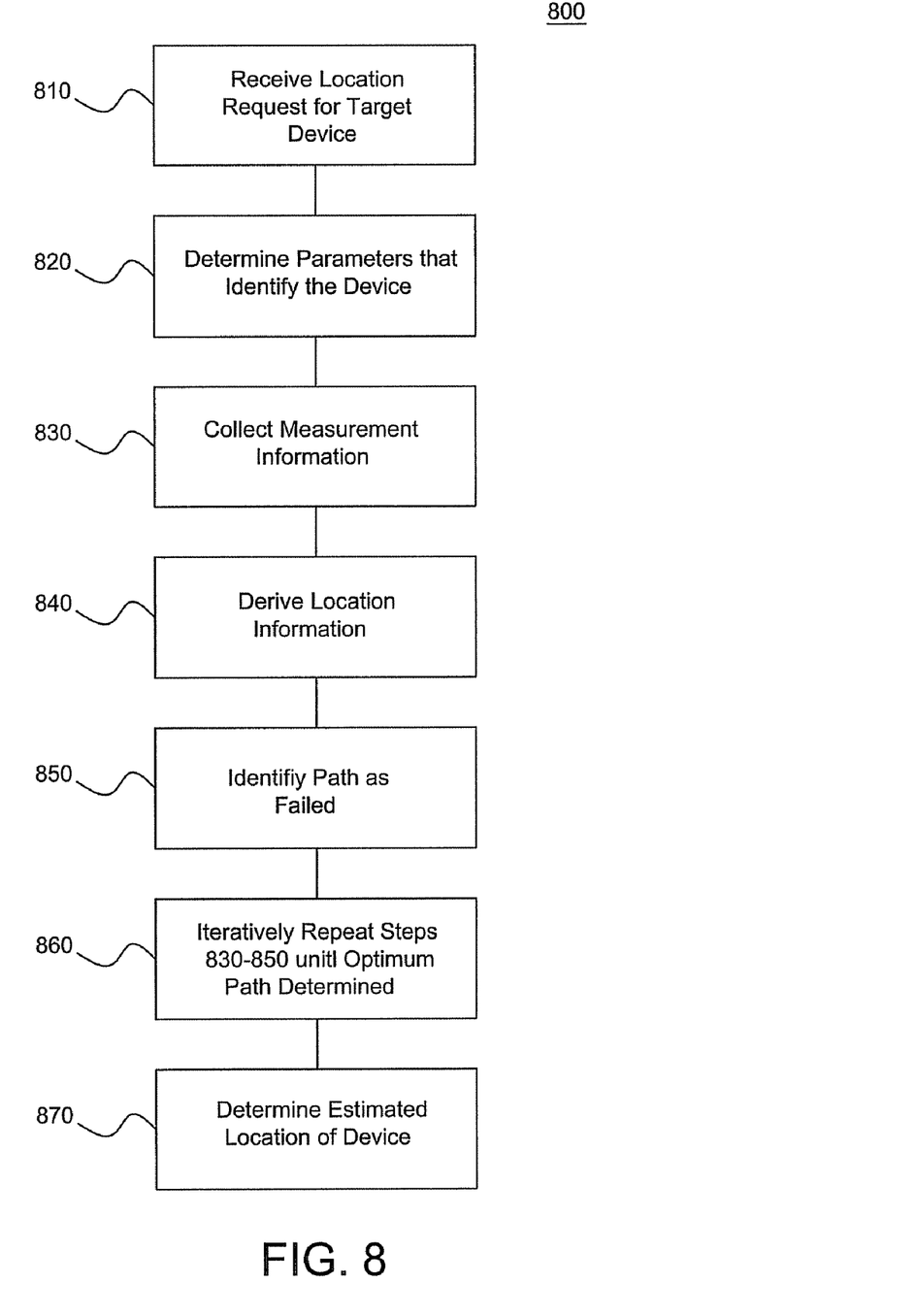
FIG. 8 is an algorithm according to another embodiment of the present subject matter.

FIG. 8 is an algorithm according to another embodiment of the present subject matter. With reference to FIG. 8, a method 800 for determining the location of a target device is provided. An exemplary device may be, but is not limited to, a cellular device, text messaging device, computer, portable computer, vehicle locating device, vehicle security device, communication device, and wireless transceiver. At step 810, a location request for a target device may be received and a plurality of parameters determined that identify the target device at step 820. Ones of the plural parameters may be, but are not limited to, Internet Protocol addresses, Media Access Control addresses, Ethernet Hardware Address, hardware address, adapter address, other hardware or software addresses, and combinations thereof.

Measurement information may be collected at step 830 as a function of one or more of the plural determined parameters to provide a plurality of measurement results. Exemplary measurement information may be the Internet Protocol address of the target device, Media Access Control address of the target device, Ethernet Hardware Address of the target device or component serving the device, hardware address of the target device or component serving the device, adapter address of the target device or component serving the device, identity of a network node through which network traffic to and from the device transits, location of network intermediaries, radio timing measurements, signal strength measurements, network configuration parameters, and combinations thereof.

Location information for the target device may be derived at step 840 as a function of one or more of the plural measurement results. This derivation may utilize a location determination function that evaluates one or more paths, each path having one or more of the plural determined parameters as an input and one or more of the plural measurement results as an output. In one embodiment, this derivation may further include deriving location information as a function of an algorithm that utilizes one or more of the plural measurement results as an input or may comprise extracting location information directly from one or more of the plural measurement results. At step 850, a path from the one or more evaluated paths may be identified as failed if location information could not be derived from the identified path. At step 860, the collection, measurement and derivation steps may be iteratively repeated until a most likely path is determined, and an estimated location of the target device determined as a function of the respective location information for the determined path at step 870. In one embodiment, one or more measurement results from a previous collecting step may be utilized as an input to a subsequent collecting step. It should be noted that the number of the plural determined parameters may be increased as an input to thereby increase the number of measurement results provided as outputs; therefore, the step of selecting a most likely path may further comprise selecting a most likely path having the fewest number of measurement results.

In embodiments of the present subject matter, unless explicitly marked, measurement information collected during the process may be retained for later iterations. This ensures that portions of the process that are executed once do not have to be executed again if they are required in a subsequent iteration of the process. If a failure occurs in the process, the initial data set, which on the first pass consists of the identification information, may also include any measurement results obtained during the first pass. This would enable generation of a shorter, wider and more optimized graph. Data may also be explicitly marked as having been consumed by, a measurement determination entity (e.g., when information is of transitory use).

Figure 9:
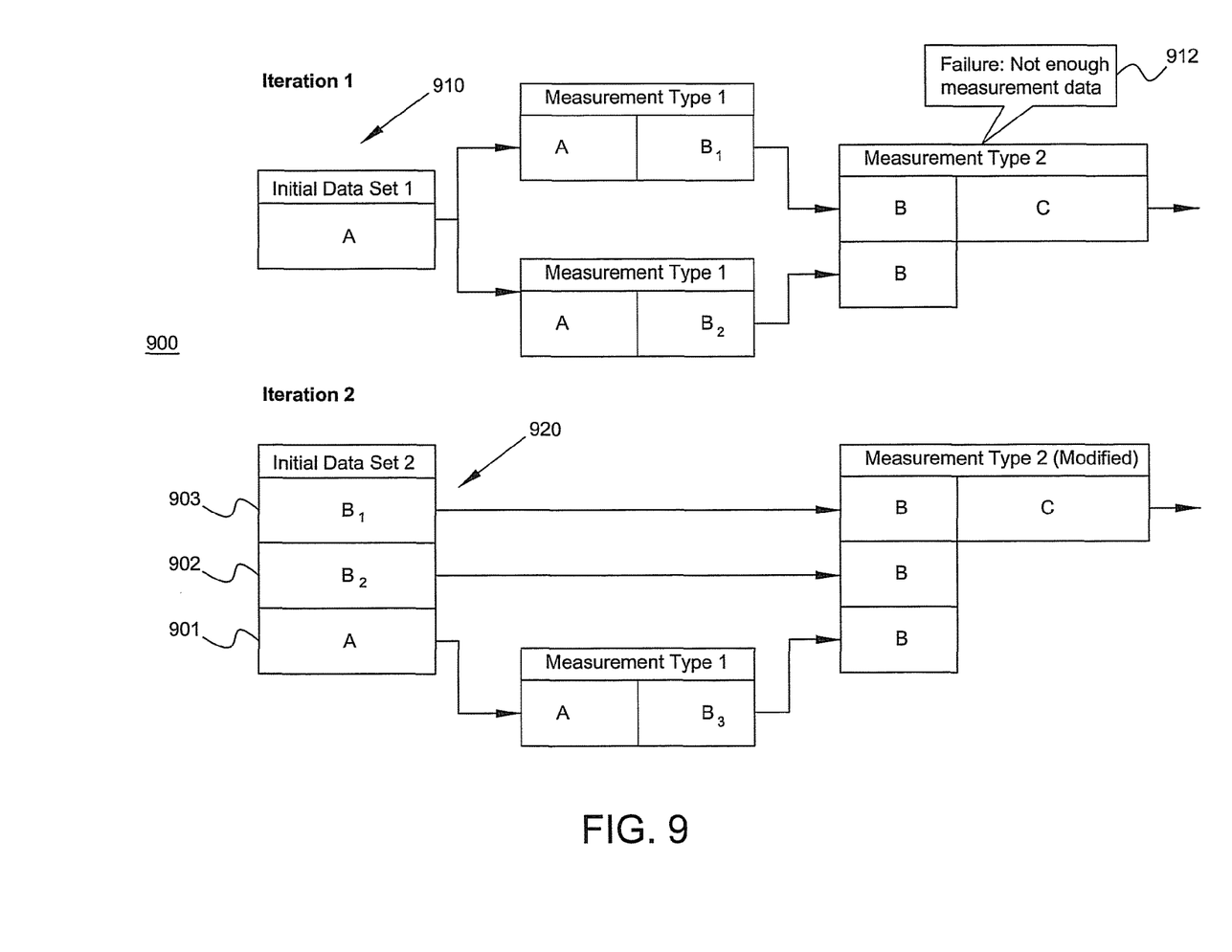
FIGS. 9 and 10 are diagrams of iterative location determination functions according to embodiments of the present subject matter.
Figure 10:
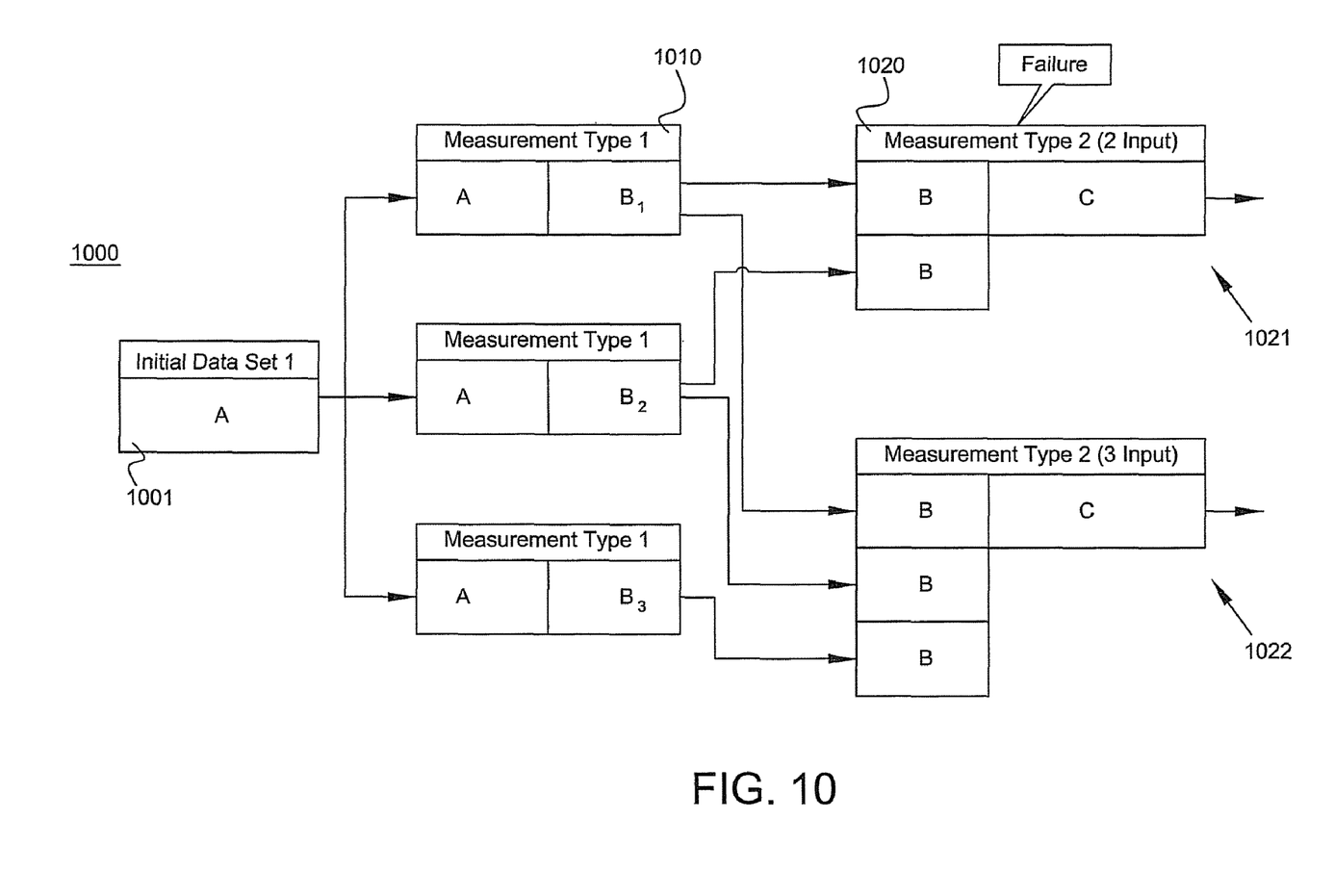

A refinement on exemplary processes according to embodiments of the present subject matter may enable iterative execution of any particular part of the graph. FIGS. 9 and 10 are diagrams of iterative location determination functions according to embodiments of the present subject matter. With reference to FIG. 9, certain algorithms discussed above may require multiple sets of measurements to produce a specific result. Therefore, it is envisioned that some location determination algorithms 900 would be iterative and require a non-deterministic number of measurement results of the same type as an input. To accommodate iterative algorithms, a measurement determination entity may report that it was unable to produce a result in a first process 910. While this failure 912 would ordinarily cause the measurement determination entity to be removed from consideration in subsequent executions, an option is provided for the measurement determination entity to modify its inputs and remain in consideration. In a typical scenario, this involves increasing the number of inputs required by the measurement determination entity. The next iteration 920 of the process would be able to select a path that uses the same measurement determination entity. Because the measurements from previous iterations 901, 902, 903 are retained by the location determination function, an increase in the number of inputs causes the process to seek only the additional measurements that were requested.

For example and with continued reference to FIG. 9, a measurement determination entity may produce a result based on anywhere from two to five inputs of type B. For the first iteration 910, the measurement determination entity is shown as requiring only two measurements. If those two measurements are inadequate, the process fails to produce an output, and the process terminates. The measurement determination entity, however, remains in consideration by increasing the number of inputs of type B it requires to three in a second iteration 920. Subsequent iterations (not shown) may require four and five inputs of type B. With reference to FIG. 10, the same problem discussed above may equally be solved by a process 1000 having multiple measurement determinations of the same type 1010, 1020 but with different numbers of inputs 1021, 1022 required, all available in the initial set 1001. A least cost calculation may initially select an option with the fewest number of measurements. Furthermore, the process relying upon modification of the measurement definition reduces the size of the graph and enables greater flexibility by permitting different sorts of modifications and dynamic control of the number of extra measurements requested at each iteration.

As shown by the various configurations and embodiments illustrated in FIGS. 1-10, a system and method for the generic application of location determination for network attached devices have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for determining the location of a target device, comprising the steps of:
   (a) receiving a location request for a target device;
   (b) determining a plurality of parameters that identify the target device;
   (c) selecting a most likely path from a plurality of paths using circuitry in a Location Information Server (LIS) to produce a location of the target device, each path defined by a plurality of location measurements, at least one of the plural location measurements having one or more of the plural determined parameters as an input and one or more measurement results as an output and a second of the plural location measurements having the one or more measurement results as an input and additional measurement results as an output;
   (d) collecting measurement information on the most likely path as a function of one or more of the determined parameters to provide the one or more measurement results;
   (e) deriving location information for the target device as a function of the one or more measurement results and the additional measurement results, the derivation utilizing a location determination function that evaluates ones of the plural paths;
   (f) iteratively repeating steps (c) through (e) to collect a predetermined amount of measurement information; and
   (g) determining an estimated location of the target device as a function of the respective location information for the selected path,
   wherein the step of selecting a most likely path further comprises selecting a most likely path having the fewest number of measurement results.

2. The method of claim 1 wherein ones of the plural parameters are selected from the group consisting of: Internet Protocol addresses, Media Access Control addresses, Ethernet Hardware Address, hardware address, adapter address, other hardware or software addresses, and combinations thereof.

3. The method of claim 1 wherein the measurement information is selected from the group consisting of: Internet Protocol address of the target device, Media Access Control address of the target device, Ethernet Hardware Address of the target device or component serving the device, hardware address of the target device or component serving the device, adapter address of the target device or component serving the device, identity of a network node through which network traffic to and from the device transits, location of network intermediaries, radio timing measurements, signal strength measurements, network configuration parameters, and combinations thereof.

4. The method of claim 1 further comprising the step of:
   (h) using one or more measurement results from a previous collecting step as an input to a subsequent collecting step.

5. The method of claim 1 further comprising the step of:
   (h) identifying a path from the evaluated paths as failed if location information could not be derived therefrom.

6. The method of claim 1 further comprising the step of:
   (h) increasing the number of the plural determined parameters as an input to thereby increase the number of measurement results provided as outputs.

7. The method of claim 1 wherein the step of deriving location information further comprises deriving location information as a function of an algorithm that utilizes one or more measurement results as an input.

8. The method of claim 1 wherein the step of deriving location information further comprises extracting location information directly from one or more measurement results.

9. The method of claim 1 wherein the target device is selected from the group consisting of: cellular device, text messaging device, computer, portable computer, vehicle locating device, vehicle security device, communication device, and wireless transceiver.

10. A method for determining the location of a target device, comprising the steps of:
    (a) receiving a location request for a target device;
    (b) determining a plurality of parameters that identify the target device;
    (c) collecting measurement information as a function of one or more of the plural determined parameters to provide a plurality of measurement results;
    (d) deriving location information for the target device as a function of one or more of the plural measurement results using circuitry in a Location Information Server (LIS), the derivation utilizing a location determination function that evaluates one or more paths, each path defined by a plurality of location measurements, at least one of the plural location measurements having one or more of the plural determined parameters as an input and one or more of the plural measurement results as an output and a second of the plural location measurements having the one or more measurement results as an input and additional measurement results as an output;
    (e) identifying a path from the one or more evaluated paths as failed if location information could not be derived from the identified path;
    (f) iteratively repeating steps (c) through (e) until a most likely path is determined; and
    (g) determining an estimated location of the target device as a function of the respective location information for the determined path,
    wherein the step of identifying a path further comprises selecting a most likely path having the fewest number of measurement results.

11. The method of claim 10 wherein ones of the plural parameters are selected from the group consisting of: Internet Protocol addresses, Media Access Control addresses, Ethernet Hardware Address, hardware address, adapter address, other hardware or software addresses, and combinations thereof.

12. The method of claim 10 wherein the measurement information is selected from the group consisting of: Internet Protocol address of the target device, Media Access Control address of the target device, Ethernet Hardware Address of the target device or component serving the device, hardware address of the target device or component serving the device, adapter address of the target device or component serving the device, identity of a network node through which network traffic to and from the device transits, location of network intermediaries, radio timing measurements, signal strength measurements, network configuration parameters, and combinations thereof.

13. The method of claim 10 further comprising the step of:
(h) using one or more measurement results from a previous collecting step as an input to a subsequent collecting step.

14. The method of claim 10 further comprising the step of:
(h) increasing the number of the plural determined parameters as an input to thereby increase the number of measurement results provided as outputs.

15. The method of claim 10 wherein the step of deriving location information further comprises deriving location information as a function of an algorithm that utilizes one or more of the plural measurement results as an input.

16. The method of claim 10 wherein the step of deriving location information further comprises extracting location information directly from one or more of the plural measurement results.

17. The method of claim 10 wherein the target device is selected from the group consisting of: cellular device, text messaging device, computer, portable computer, vehicle locating device, vehicle security device, communication device, and wireless transceiver.

18. A location information server ("LIS") comprising:
(a) circuitry for receiving a location request for a target device;
(b) circuitry for determining a plurality of parameters that identify the target device;
(c) circuitry for selecting a most likely path from a plurality of paths, each path defined by a plurality of location measurements, at least one of the plural location measurements having one or more of the plural determined parameters as an input and one or more measurement results as an output and a second of the plural location measurements having the one or more measurement results as an input and additional measurement results as an output, wherein the selected path has the fewest number of measurement results;
(d) circuitry for deriving location information for the target device as a function of one or more measurement results and the additional measurement results, the derivation utilizing a location determination function that evaluates ones of the plural paths;
(e) circuitry for iteratively collecting a predetermined amount of measurement information as a function of one or more of the plural determined parameters to provide the one or more measurement results; and
(f) circuitry for determining an estimated location of the target device as a function of the respective location information for the selected path.

19. The LIS of claim 18 wherein ones of the plural parameters are selected from the group consisting of: Internet Protocol addresses, Media Access Control addresses, Ethernet Hardware Address, hardware address, adapter address, other hardware or software addresses, and combinations thereof.

20. The LIS of claim 18 wherein the measurement information is selected from the group consisting of: Internet Protocol address of the target device, Media Access Control address of the target device, Ethernet Hardware Address of the target device or component serving the device, hardware address of the target device or component serving the device, adapter address of the target device or component serving the device, identity of a network node through which network traffic to and from the device transits, location of network intermediaries, radio timing measurements, signal strength measurements, network configuration parameters, and combinations thereof.

21. The LIS of claim 18 further comprising circuitry that derives location information as a function of an algorithm that utilizes the one or more measurement results as an input.

22. The LIS of claim 18 wherein the target device is selected from the group consisting of: cellular device, text messaging device, computer, portable computer, vehicle locating device, vehicle security device, communication device, and wireless transceiver.

* * * * *